United States Patent
Singh et al.

(10) Patent No.: US 11,048,933 B2
(45) Date of Patent: Jun. 29, 2021

(54) GENERATING STRUCTURED REPRESENTATIONS OF FORMS USING MACHINE LEARNING

(71) Applicant: Intuit Inc., Mountain View, CA (US)

(72) Inventors: Anu Singh, San Jose, CA (US); Saikat Mukherjee, Fremont, CA (US); Mritunjay Kumar, Bangalore (IN); Karpaga Ganesh Patchirajan, Plano, TX (US)

(73) Assignee: Intuit Inc., Mountain View, CA (US)

( * ) Notice: Subject to any disclaimer, the term of this patent is extended or adjusted under 35 U.S.C. 154(b) by 88 days.

(21) Appl. No.: 16/569,297

(22) Filed: Sep. 12, 2019

(65) Prior Publication Data

US 2021/0034858 A1    Feb. 4, 2021

(30) Foreign Application Priority Data

Jul. 31, 2019    (IN) .............................. 201921030867

(51) Int. Cl.
*G06K 9/00* (2006.01)
*G06K 9/62* (2006.01)
*G06N 20/00* (2019.01)

(52) U.S. Cl.
CPC ....... *G06K 9/00463* (2013.01); *G06K 9/6215* (2013.01); *G06N 20/00* (2019.01)

(58) Field of Classification Search
CPC ............ G06K 9/00463; G06K 9/6215; G06K 9/00456; G06K 9/00449; G06K 9/00442; G06K 9/00469; G06K 9/00483; G06N 20/00; G06F 16/951; G06F 16/93; G06F 16/9535; G06F 16/986

See application file for complete search history.

(56) References Cited

U.S. PATENT DOCUMENTS

| | | | |
|---|---|---|---|
| 7,706,580 B2 * | 4/2010 | Houle | G06K 9/036 382/119 |
| 7,716,225 B1 * | 5/2010 | Dean | G06F 40/134 707/748 |
| 9,111,140 B2 * | 8/2015 | Stokes | G06K 9/344 |
| 10,248,858 B2 * | 4/2019 | Ho | G06F 40/174 |
| 10,339,185 B2 * | 7/2019 | Abou Mahmoud | G06F 40/131 |
| 10,387,531 B1 * | 8/2019 | Vanhoucke | G06N 3/04 |
| 10,546,054 B1 * | 1/2020 | Foroughi | G06K 9/00442 |
| 10,621,237 B1 * | 4/2020 | Rathnavelu | G06F 16/951 |
| 10,798,236 B2 * | 10/2020 | Stone | H04M 1/72403 |
| 2003/0037312 A1 * | 2/2003 | Czech | G06F 8/42 717/120 |

(Continued)

*Primary Examiner* — Michael S Osinski
(74) *Attorney, Agent, or Firm* — Ferguson Braswell Fraser Kubasta PC

(57) ABSTRACT

A method may include acquiring, from a document, document elements and attributes describing the document elements. One or more of the attributes may be geometric attributes describing a placement of the corresponding document element within the document. The method may further include deriving features for the document elements using the attributes, detecting form components using the features, clustering the form components into line objects of a structured representation by applying an unsupervised machine learning model to the geometric attributes of the document elements, and populating a compliance form using the structured representation.

15 Claims, 8 Drawing Sheets

(56) References Cited

U.S. PATENT DOCUMENTS

| | | | |
|---|---|---|---|
| 2003/0164979 A1* | 9/2003 | Shimakawa | H04N 1/387 |
| | | | 358/1.18 |
| 2005/0289121 A1* | 12/2005 | Nakamura | G06F 16/986 |
| 2009/0138466 A1* | 5/2009 | Henry | G06F 16/40 |
| 2009/0144277 A1* | 6/2009 | Trutner | G06F 40/137 |
| 2010/0076991 A1* | 3/2010 | Nakano | G06F 16/3334 |
| | | | 707/759 |
| 2010/0306249 A1* | 12/2010 | Hill | G06Q 50/01 |
| | | | 707/769 |
| 2014/0278448 A1* | 9/2014 | Sadeghi | G06Q 10/10 |
| | | | 705/2 |
| 2014/0316768 A1* | 10/2014 | Khandekar | G06F 16/3329 |
| | | | 704/9 |
| 2015/0019382 A1* | 1/2015 | Shinzato | G06F 40/247 |
| | | | 705/26.63 |
| 2015/0093021 A1* | 4/2015 | Xu | G06K 9/00463 |
| | | | 382/159 |
| 2017/0193545 A1* | 7/2017 | Zhou | G06Q 30/0243 |
| 2018/0181808 A1* | 6/2018 | Sridharan | G06K 9/00483 |
| 2018/0218283 A1* | 8/2018 | Jenson | G06Q 50/01 |
| 2018/0374171 A1* | 12/2018 | Aizen | G06Q 10/107 |
| 2019/0294921 A1* | 9/2019 | Kalenkov | G06K 9/00201 |
| 2020/0160050 A1* | 5/2020 | Bhotika | G06K 9/00463 |
| 2020/0175267 A1* | 6/2020 | Schafer | G06K 9/00463 |
| 2021/0012199 A1* | 1/2021 | Zhang | G06N 3/08 |
| 2021/0034853 A1* | 2/2021 | Matsumoto | G06N 3/08 |

* cited by examiner

T1-2018            Federal Tax            Schedule 1

This schedule represents Step 5 in completing your return. Complete this schedule and attach it to your return.
Claim only the credits that apply to you.
The Income Tax and Benefit Guide may have additional information for certain lines.

Step A - Federal non-refundable tax credits

| | | |
|---|---|---|
| Basic personal amount | claim $11,809 300 | 1 |
| Age amount (if you were born in 1953 or earlier) (Complete the Worksheet for Schedule 1.) (maximum $7,333) | 301 + | 2 |
| Spouse or common-law partner amount (Complete Schedule 5.) | 303 + | 3 |
| Canada caregiver amount for spouse or common-law partner, or eligible dependant age 18 or older (Complete Schedule 5.) | 304 + | 4 |
| Amount for an eligible dependant (Complete Schedule 5.) | 305 + | 5 |
| Canada caregiver amount for other infirm dependants age 18 or older (Complete Shedule 5.) | 307 + | 6 |

Initial Document 300

Initial Document Type 302

Initial Document Element A 304A

Initial Document Element B 304B

Initial Document Element C 304C

Initial Document Element D 304D

FIG. 3A

GENERATING STRUCTURED REPRESENTATIONS OF FORMS USING MACHINE LEARNING

BACKGROUND

Software applications (e.g., financial management applications) may process a variety of online forms, such as compliance forms designed to comply with government regulations and into which users enter data. It would be advantageous to provide a capability to automatically generate a structured, machine-readable representation of a form embodied in a document. For example, the document may be represented in a structured file using the Portable Document Format (PDF). Such a capability could facilitate the development and maintenance of a knowledge base of forms. For example, such a capability may avoid the burden of explicitly updating a large number of online forms (e.g., forms used in a variety of jurisdictions) when the definitions of the forms are modified (e.g., when government regulations change). In addition, rule-based approaches to document processing are not scalable since rule-based approaches typically require adaptation of the rules when applied to different jurisdictions.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, one or more embodiments relate to a method including acquiring, from a document, document elements and attributes describing the document elements. One or more of the attributes are geometric attributes describing a placement of the corresponding document element within the document. The method further includes deriving features for the document elements using the attributes, detecting form components using the features, clustering the form components into line objects of a structured representation by applying an unsupervised machine learning model to the geometric attributes of the document elements, and populating a compliance form using the structured representation.

In general, in one aspect, one or more embodiments relate to a system including a memory coupled to a computer processor, a repository configured to store a document including document elements and attributes describing the document elements. One or more of the attributes are geometric attributes describing a placement of the corresponding document element within the document. The repository is further configured to store a structured representation including form components and line objects, and an unsupervised machine learning model. The system further includes a structured representation generator, executing on the computer processor and using the memory, configured to acquire, from the document, document elements and attributes describing the document elements, derive features for the document elements using the attributes, detect form components using the features, cluster the form components into the line objects by applying the unsupervised machine learning model to the geometric attributes of the document elements, and populate a compliance form using the structured representation.

In general, in one aspect, one or more embodiments relate to a method including acquiring, from an initial document having a document type, initial document elements and initial attributes describing the initial document elements. One or more of the initial attributes are geometric attributes describing a placement of the corresponding initial document element within the initial document. The method further includes deriving initial features for the initial document elements using the initial attributes, detecting initial form components using the initial features, clustering the initial form components into initial line objects of an initial structured representation by applying an unsupervised machine learning model to the geometric attributes of the initial document elements, adding the initial structured representation to a repository, acquiring, from a next document having the document type, next document elements and next attributes describing the next document elements. One or more of the next attributes are geometric attributes describing a placement of the corresponding next document element within the next document. The method further includes deriving next features for the next document elements using the next attributes, detecting next form components using the next features, determining that the initial form components and the next form components are different, and in response to determining that the initial form components and the next form components are different: clustering the next form components into next line objects of a next structured representation by applying the unsupervised machine learning model to the geometric attributes of the next document elements, and replacing, in the repository, the initial structured representation with the next structured representation.

Other aspects of the invention will be apparent from the following description and the appended claims.

BRIEF DESCRIPTION OF DRAWINGS

FIG. 3A, FIG. 3B, FIG. 4A, and FIG. 4B show examples in accordance with one or more embodiments of the invention.

DETAILED DESCRIPTION

Figure 1:
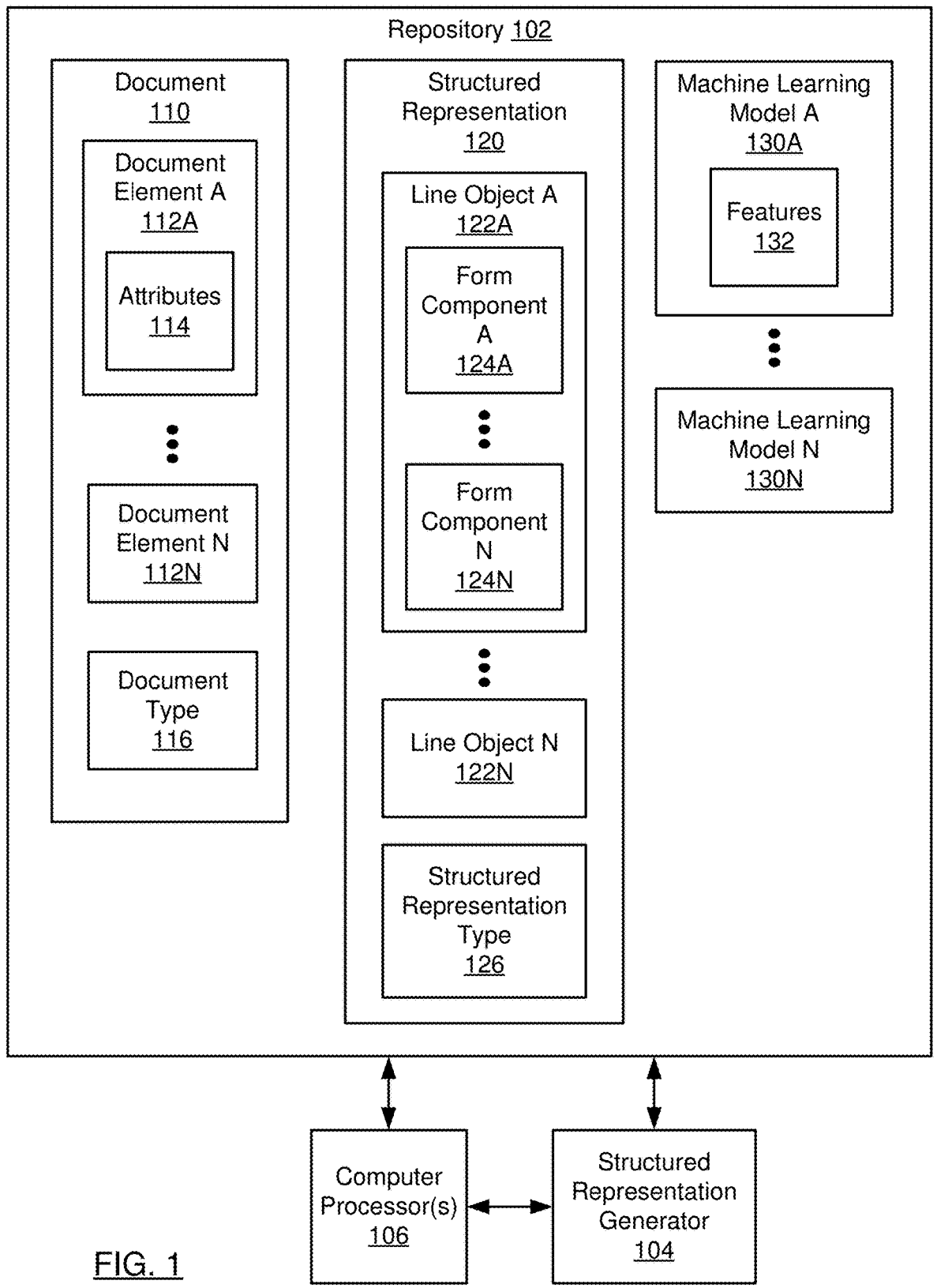
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention are directed to generating a structured representation of a form. In one or more embodiments, document elements and attributes describing the document elements are acquired from a document. The document may be a file (e.g., a file represented using the Portable Document Format (PDF)). For example, the document may represent a compliance form (e.g., a tax form) to be completed by a user. Examples of document elements may include (i) chunks of text and (ii) shapes (e.g., rectangles or boxes that represent input fields). In one or more embodiments, attributes describing document elements include (i) textual attributes and (ii) geometric attributes indicating the placement of the document element within the document.

In one or more embodiments, the structured representation is a schema for a form that includes form components that are clustered into line objects. Examples of form components may include fields, field descriptions, field numbers, line descriptions, line numbers, etc.

In one or more embodiments, machine learning models are used to classify document elements as different types of form components using features derived from the attributes of the document elements. The features may be derived by aggregating, summarizing and/or applying statistical measurements to the textual and/or geometric attributes of the document elements. In one or more embodiments, the form components are clustered into line objects by applying an unsupervised machine learning model to the geometric attributes of the document elements.

In one or more embodiments, the structured representation may be used to populate a form. For example, the form may require values (e.g., obtained from a graphical user interface (GUI) or a database) corresponding to one or more form components of the structured representation. In one or more embodiments, the structured representation is updated in a knowledge base after processing a next document having the same document type as the initial document. For example, the next document may represent an updated version of a compliance form (e.g., audit form, data security form, tax form, medical form, privacy policy, etc.) represented by the initial document. Alternatively, the next document may be a version of the initial document that is adapted to a jurisdiction (e.g., State of New York, Country of Canada, etc.) different from a jurisdiction (e.g., State of California, Republic of Mexico, etc.) corresponding to the initial document. In this way, the structured representation may be continuously updated, as documents are processed.

FIG. 1 shows a system (100) in accordance with one or more embodiments of the invention. As shown in FIG. 1, the computer system (100) includes a repository (102), a structured representation generator (104), and one or more computer processors (106). In one or more embodiments, the computer system (100) takes the form of the computing system (500) described with respect to FIG. 5A and the accompanying description below or takes the form of the client device (526) described with respect to FIG. 5B. In one or more embodiments, the computer processor(s) (106) takes the form of the computer processor(s) (502) described with respect to FIG. 5A and the accompanying description below.

In one or more embodiments, the repository (102) may be any type of storage unit and/or device (e.g., a file system, database, collection of tables, or any other storage mechanism) for storing data. Further, the repository (102) may include multiple different storage units and/or devices. The multiple different storage units and/or devices may or may not be of the same type or located at the same physical site.

In one or more embodiments, the repository (102) includes a document (110), a structured representation (120), and machine learning models (130A, 130N). In one or more embodiments, the document (110) is a file that may be represented using the Portable Document Format (PDF), HyperText Markup Language (HTML), eXtensible Markup Language (XML), JavaScript Object Notation (JSON), or any other file format. For example, the document (110) may represent a compliance form (e.g., audit form, data security form, tax form, medical form, privacy policy, etc.) to be completed by a user, and designed to comply with the regulations of a government agency. Continuing this example, the compliance form may be specific to a jurisdiction (e.g., a geographic region such as a state, country, region, municipality, reinvestment zone, etc.).

Continuing with FIG. 1, the document (110) includes document elements (112A, 112N) and a document type (116) in accordance with one or more embodiments of the invention. A document element (112A) may be a component of the document (110). A document element (112A) may be a chunk of text. Alternatively, a document element (112A) may be a shape (e.g., a line or rectangle), an image (e.g., a bitmap), etc. For example, a document element (112A) may be a rectangle or box that represents an input field. In one or more embodiments, a document element (112A) includes attributes (114) that describe the document element (112A). The attributes (114) may be textual attributes such as font, font size, number of characters (e.g., broken down into the number of numeric characters and the number of alphabetic characters), number of words, etc. In one or more embodiments, the attributes (114) include geometric attributes indicating the placement of the document element (112A) within the document (110). In one or more embodiments, the placement may be expressed in terms of a region (e.g., a rectangle) in a coordinate system (e.g., Cartesian coordinates within the document (110)), where the region encompasses the document element (112A). In one or more embodiments, the placement may be used to calculate distances between document elements (112A, 112N).

In one or more embodiments, the document type (116) is a category that describes the document (110). For example, the document type (116) may be a general category, such as tax document, payroll document, or legal document. Alternatively, the document type (116) may be a specific category, such as Schedule 1 of a Federal Tax Form, etc.

Figure 3B:
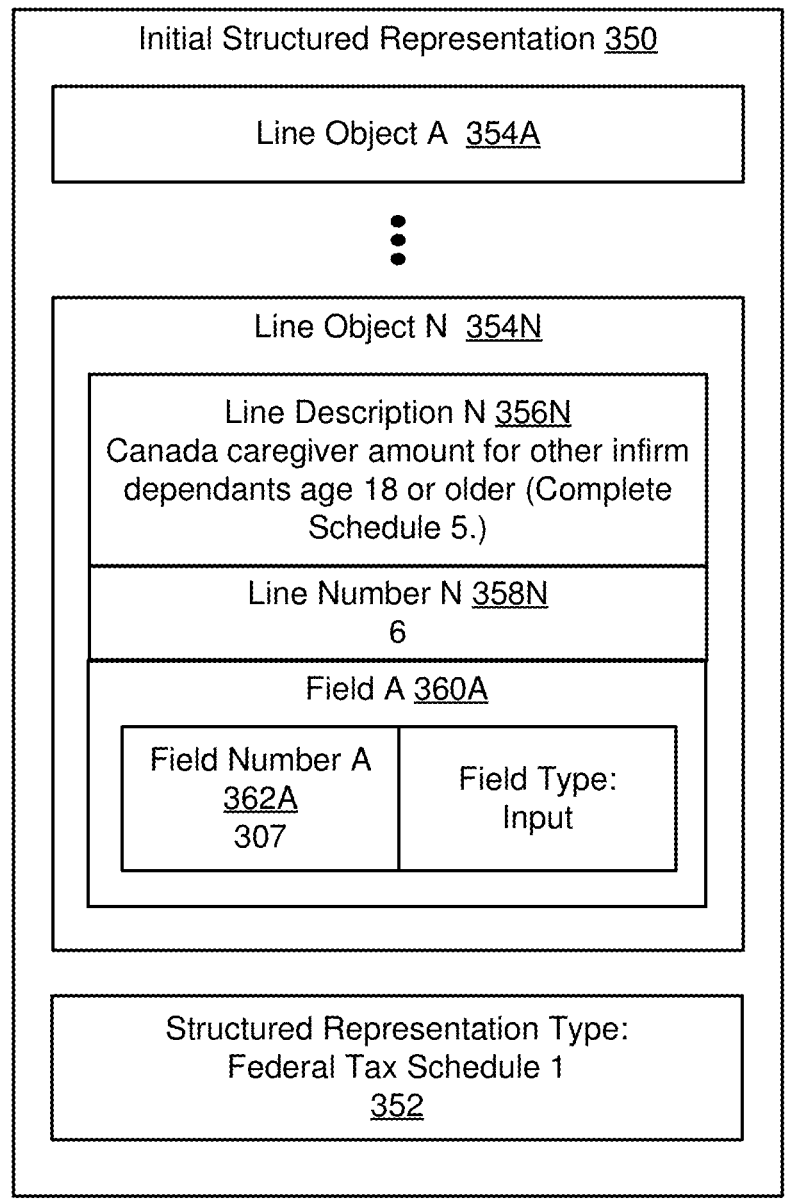

In one or more embodiments, the structured representation (120) is a schema for a form. For example, the schema may be represented using JSON or XML. In one or more embodiments, the structured representation (120) includes line objects (122A, 122N) and a structured representation type (126). A line object (122A) may include one or more form components (124A, 124N). A form component (124A) may be any component of the structured representation (120). Examples of form components (124A, 124N) may include line descriptions, line numbers, fields, field numbers, field descriptions, etc. (e.g., as illustrated in the initial structured representation (350) of FIG. 3B and the next structured representation (450) of FIG. 4B). A form component (124A) may include other form components. For example, as illustrated in FIG. 3B, a field (360A) may include a field number (362A). In one or more embodiments, a form component (124A) includes line objects (122A, 122N). For example, a "section" form component or "page" form component may include several line objects (122A, 122N). In one or more embodiments, a value is assigned to a form component (124A). For example, the value may be a text value, numeric value, check mark, etc.

In one or more embodiments, a line object (122A) corresponds to a placement within the document (110). For example, a line object (122A) may correspond to a placement (e.g., a line) within the document (110) that is within a threshold distance of the placements (e.g., regions) of the document elements (112A, 112N) corresponding to one or more form components (124A, 124N).

In one or more embodiments, the structured representation type (126) is a category that describes the structured representation (120). The structured representation type (126) may correspond to the document type (116) of a document (110). For example, the structured representation type (126) may be a general category, such as tax document, payroll document, or legal document. Alternatively, the structured representation type (126) may be a specific category, such as Schedule 1 of a Federal Tax Form, etc. In one or more embodiments, the structured representations (120) included in the repository (102) may be accessed (e.g., queried) using the structured representation type (126).

In one or more embodiments, the machine learning models (130A, 130N) include supervised models with functionality to classify document elements (112A, 112N) as different types of form components (124A, 124N). For example, one machine learning model may classify a document element (112A) as a "description" form component (e.g., field description, line description, etc.). As another example, a machine learning model may classify a document element (112A) as a "number" form component (e.g., field number, line number, etc.). As yet another example, a machine learning model may classify a document element (112A) as an "input field" form component. As another example, a machine learning model may classify a document element (112A) as a "section header" form component. The supervised models may be trained using document elements (112A, 112N) labeled as various types of form components (124A, 124N). For example, a "checkbox" may be a type of "input field" form component. Continuing this example, based on the training data, the checkbox may correspond to a document element (112A) with a geometric attribute of "rectangle". Alternatively or additionally, based on the training data, the checkbox may correspond to a set of four document elements each described by a geometric attribute of "line", such that the set of document elements satisfy a constraint. For example, the constraint may be that each document element in the set forms a right angle with two of the other document elements in the set.

In one or more embodiments, the machine learning models (130A, 130N) include functionality to perform the classification using features (132) derived from the attributes (114) of the document elements (112A, 112N). For example, the features (132) may be based on aggregating or summarizing the attributes (114) of the document elements (112A, 112N). As another example, the features (132) may be based on statistical measurements applied to the attributes (114) of the document elements (112A, 112N). Alternatively, the features (132) may represent any distinguishing characteristics corresponding to the attributes (114).

In one or more embodiments, the machine learning models (130A, 130N) are implemented as classifiers using XGBoost (available at https://github.com/dmlc/xgboost). Alternatively, the machine learning models (130A, 130N) may be implemented as k-nearest neighbor (k-NN) classifiers. Still alternatively, the machine learning models (130A, 130N) may be implemented as various types of deep learning classifiers, such as a neural network classifier (e.g., based on convolutional neural networks (CNNs)), random forest classifier, SGD classifier, lasso classifier, gradient boosting classifier, bagging classifier, ada boost classifier, ridge classifier, elastic net classifier, or NuSVR classifier. Deep learning, also known as deep structured learning or hierarchical learning, is part of a broader family of machine learning methods based on learning data representations, as opposed to task-specific algorithms.

In one or more embodiments, the machine learning models (130A, 130N) include an unsupervised model with functionality to cluster form components (124A, 124N) (e.g., form components (124A, 124N) detected by the supervised models) into line objects (122A, 122N). In one or more embodiments, the unsupervised model may use a variety of techniques (e.g., k-means clustering, centroid-based clustering, hierarchical clustering, distribution-based clustering, density-based clustering, naïve Bayes, etc.) to perform the clustering. The unsupervised model may include functionality to perform the clustering using a distance measure based on attributes (114) (e.g., geometric attributes) of document elements (112A, 112N) corresponding to the form components (124A, 124N). For example, the distance measure may be based on a Cartesian distance between the boundaries of the document elements (112A, 112N). Continuing this example, form components (124A, 124N) whose corresponding document elements (112A, 112N) are within a threshold distance of each other may be clustered with the same line object (122A). Further continuing this example, the document elements (112A, 112N) may also be within a threshold distance of the Cartesian coordinates of a placement (e.g., a line in the Cartesian plane) within the document (110) corresponding to the line object (122A). In one or more embodiments, the unsupervised model may include functionality to associate form components (124A, 124N) within a line object (122A) using a distance measure.

In one or more embodiments, the unsupervised model may include functionality to associate multiple line objects (122A, 122N) using a distance measure. For example, multiple line objects (122A, 122N) may be clustered into a larger form component (e.g., a section or page that includes the multiple line objects (122A, 122N)).

In one or more embodiments, the structured representation generator (104) may be implemented in hardware (e.g., circuitry), software, firmware, and/or any combination thereof. The structured representation generator (104) may include functionality to acquire document elements (112A, 112N) and attributes (114) describing the document elements (112A, 112N) from a document (110). In one or more embodiments, the structured representation generator (104) includes functionality to derive features (132) using the attributes (114) of document elements (112A, 112N). The structured representation generator (104) may include functionality to generate a structured representation (120). The structured representation generator (104) may include functionality to replace a structured representation (120) stored in the repository (102). In one or more embodiments, the computer processor (106) includes functionality to execute the structured representation generator (104).

While FIG. 1 shows a configuration of components, other configurations may be used without departing from the scope of the invention. For example, various components may be combined to create a single component. As another example, the functionality performed by a single component may be performed by two or more components.

Figure 2A:
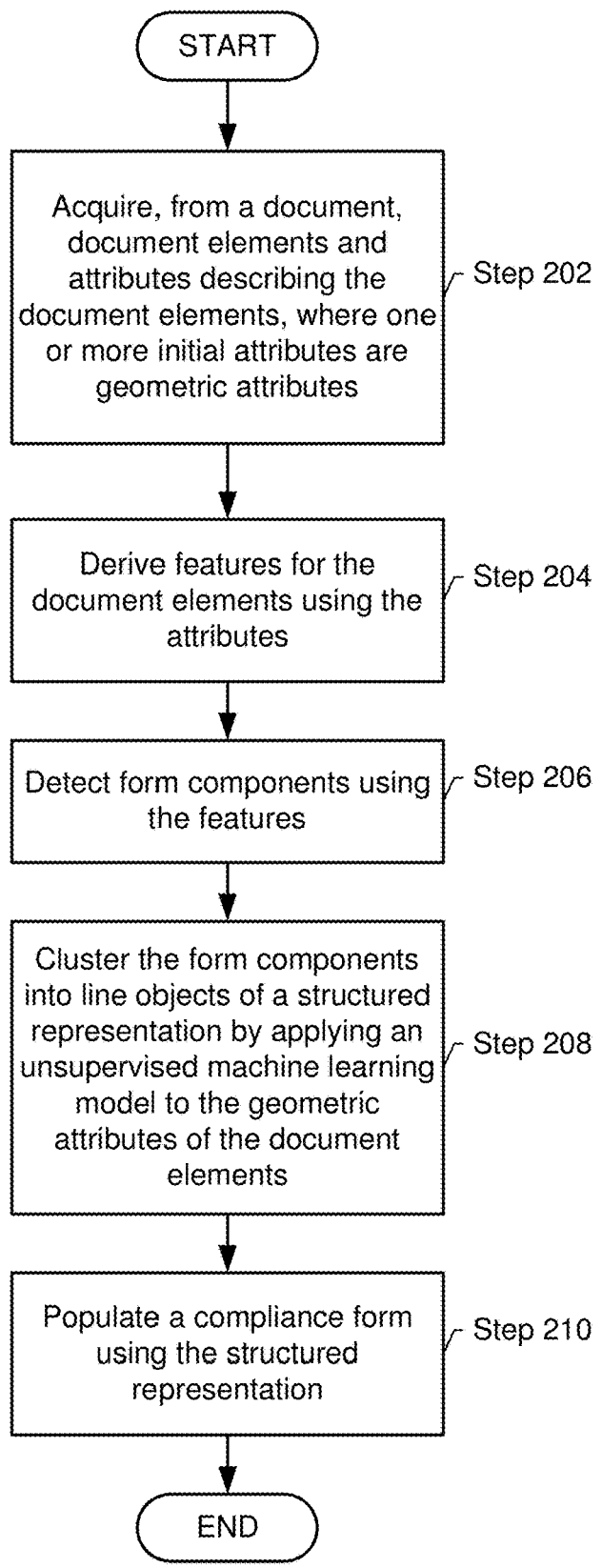
FIG. 2A and FIG. 2B show flowcharts in accordance with one or more embodiments of the invention.

FIG. 2A shows a flowchart in accordance with one or more embodiments of the invention. The flowchart depicts a process for generating a structured representation of a form. One or more of the steps in FIG. 2A may be performed by the components (e.g., the structured representation generator (104) and the machine learning models (130A, 130N) of the system (100)) discussed above in reference to FIG. 1. In one or more embodiments, one or more of the steps shown in FIG. 2A may be omitted, repeated, and/or performed in parallel, or in a different order than the order shown in FIG. 2A. Accordingly, the scope of the invention should not be considered limited to the specific arrangement of steps shown in FIG. 2A.

Initially, in Step 202, document elements and attributes describing the document elements are acquired from a document. The structured representation generator may obtain the document from a repository. In one or more embodiments, the structured representation generator acquires the document elements and the attributes from the document using a software tool. For example, the structured representation generator may use a PDF mining tool to extract, from a document represented in PDF, document elements and attributes describing the document elements.

In Step 204, features for the document elements are derived using the attributes. For example, the features may be derived by aggregating, summarizing and/or applying statistical measurements to the textual and/or geometric attributes of the document elements.

In Step 206, form components are detected using the features. The structured representation generator may apply machine learning models to the features to detect the form components. For example, each type of form component may be detected by a machine learning model that is trained to detect that particular type of form component.

In Step 208, the form components are clustered into line objects of a structured representation by applying an unsupervised machine learning model to the geometric attributes of the document elements. In one or more embodiments, the unsupervised machine learning model clusters the form components using a distance measure based on the geometric attributes of the document elements corresponding to the form components. For example, the unsupervised machine learning model may cluster, into a line object, form components corresponding to document elements whose placement (e.g., region) within the document is within a threshold distance of a y-coordinate value of a line corresponding to the line object. Continuing this example, the form components may include multiple "field" form components. Further continuing this example, the multiple "field" form components may correspond to cells in a row of a table, such that the line object corresponds to the row of the table.

In one or more embodiments, the unsupervised machine learning model associates, within a line object, multiple form components using a distance measure based on the geometric attributes of the document elements corresponding to the multiple form components. For example, the unsupervised machine learning model may associate a "field" form component with a "field description" form component clustered within the same line object when the regions (e.g., the x-coordinates of the regions) corresponding to the document elements corresponding to the field form component and the field description form component are within a threshold distance of each other.

In one or more embodiments, the unsupervised machine learning model associates multiple line objects together using a distance measure based on the placements within the document corresponding to the multiple line objects. For example, the unsupervised machine learning model may associate multiple line objects with a "section" form component when the placements corresponding to the multiple line objects are within a threshold distance of a "section header" form component that is included in the "section" form component. Similarly, the unsupervised machine learning model may associate multiple line objects with a "table" form component when the placements corresponding to the multiple line objects are within a threshold distance of a "table header" form component that is included in the "table" form component.

In Step 210, a compliance form is populated using the structured representation. For example, the compliance form may be an instance of the structured representation such that the compliance form requires values corresponding to one or more of the form components of the structured representation. In one or more embodiments, the values are obtained corresponding to one or more of the form components (e.g., "input field" form components) of the structured representation. The compliance form may then be populated using the values obtained for the form components. In one or more embodiments, the values are obtained from a graphical user interface (GUI) with functionality to receive input from a user. Alternatively, the values may be obtained from a database. For example, the value for a form component of a structured representation whose structured representation type is "W2 form" may be obtained from a payroll database.

Figure 4A:
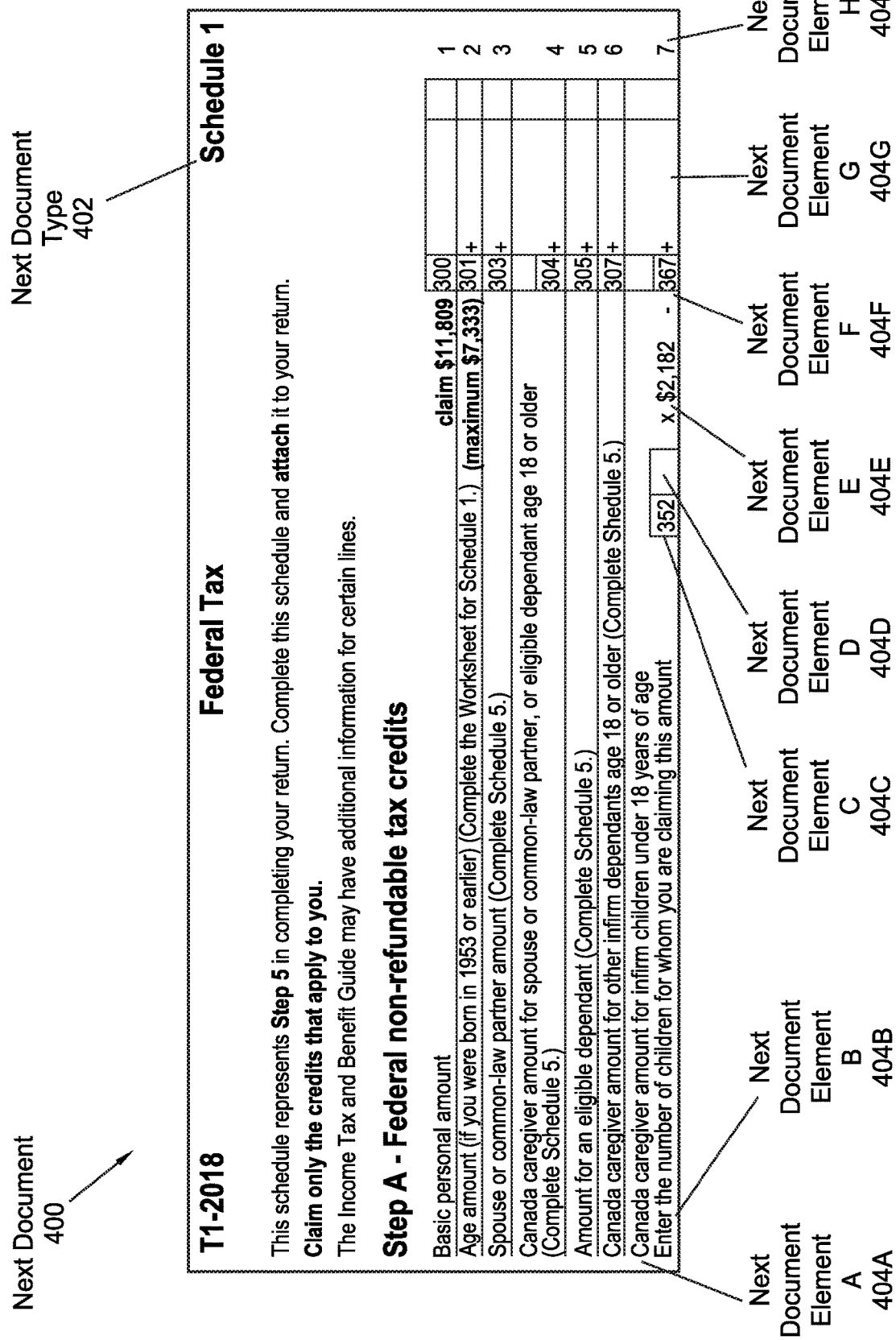

In one or more embodiments, multiple form components are associated to represent a calculation. In one or more embodiments, the compliance form is populated by performing the calculation using values corresponding to the multiple form components. For example, the value for a "calculated" form component may be calculated using a numerical value obtained for a "input" form component and a numerical value included in a "description" form component. Continuing this example, the description form component may include a numerical value to be multiplied by the value of the input form component to calculate the calculated form component. FIG. 4A illustrates this scenario, where next document element D (404D) corresponds to the input form component, next document element E (404E) corresponds to the description form component that includes a multiplicative factor of $2182, and next document element G (404G) corresponds to the calculated form component.

Figure 2B:
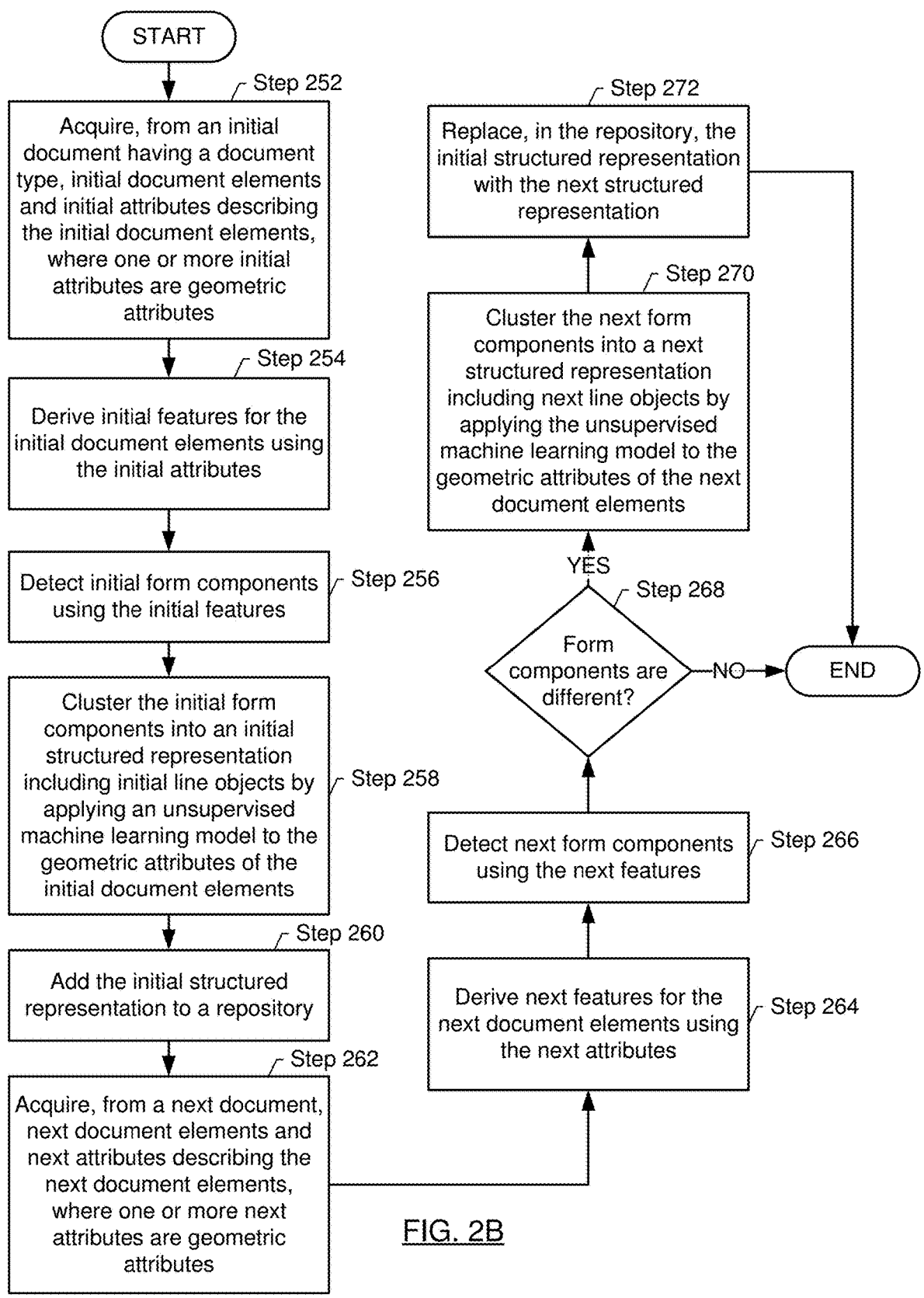

FIG. 2B shows a flowchart in accordance with one or more embodiments of the invention. The flowchart depicts a process for process for generating a structured representation of a form. One or more of the steps in FIG. 2B may be performed by the components (e.g., the structured representation generator (104) and the machine learning models (130A, 130N) of the system (100)) discussed above in reference to FIG. 1. In one or more embodiments, one or more of the steps shown in FIG. 2B may be omitted, repeated, and/or performed in parallel, or in a different order than the order shown in FIG. 2B. Accordingly, the scope of the invention should not be considered limited to the specific arrangement of steps shown in FIG. 2B.

Initially, in Step 252, initial document elements and initial attributes describing the initial document elements are acquired from an initial document (see description of Step 202 above). The initial document may have a document type (e.g., a type of compliance form).

In Step 254, initial features for the initial document elements are derived using the initial attributes (see description of Step 204 above).

In Step 256, initial form components are detected using the initial features (see description of Step 206 above).

In Step 258, the initial form components are clustered into initial line objects of an initial structured representation by applying an unsupervised machine learning model to the geometric attributes of the initial document elements (see description of Step 208 above).

In Step 260, the initial structured representation is added to a repository. In one or more embodiments, the repository serves as a knowledge base of structured representations. For example, the structured representations in the repository may be used to populate compliance forms. In one or more embodiments, the initial structured representation corresponds to a jurisdiction. For example, the jurisdiction may be a geographic region (e.g., a country, state, city, province, etc.). In one or more embodiments, the structured representations included in the repository may be accessed (e.g., queried) using the structured representation type.

In Step 262, next document elements and next attributes describing the next document elements are acquired from a next document (see description of Step 252 above). The next document may have the same document type as the initial document. For example, the next document may represent an updated version of a compliance form represented by the initial document. Alternatively, the next document may be a version of the initial document that is adapted to a jurisdiction different from a jurisdiction corresponding to the initial document.

In Step 264, next features for the next document elements are derived using the next attributes (see description of Step 254 above).

In Step 266, next form components are detected using the next features (see description of Step 256 above).

If, in Step 268, a determination is made that the initial form components and the next form components are different, then Step 270 below is executed. In one or more embodiments, the initial form components and the next form components are different when at least one of the following is true:

1) the next form components include a form component that is not present in the initial form components (e.g., the next form components include a field that is not present in the initial form components),
2) the initial form components include a form component that is not present in the next form components (e.g., the next form components omit a field that was present in the initial form components), or
3) the next form components include a form component that is a modified version of one of the initial form components (e.g., the next form components modify a field description that was present in the initial form components).

In Step 270, the next form components are clustered into next line objects of a next structured representation by applying the unsupervised machine learning model to the geometric attributes of the next document elements (see description of Step 258 above). In one or more embodiments, the next line objects include a line object that is not present in the initial line objects. For example, one or more new fields present in the next form components, but not present in the initial form components, may be clustered into a new line object. In one or more embodiments, the initial line objects include a line object that is not present in the next line objects. For example, the form components comprising one of the initial line objects may be omitted in the next form components. In one or more embodiments, the next line objects include a line object that is a modified version of one of the initial line objects. For example, a form component in one of the next line objects may be a modified version of a form component in one of the initial line objects.

In Step 272, the initial structured representation is replaced with the next structured representation in the repository. For example, the next structured representation may representation an updated version of the initial structured representation. In other words, the initial structured representation may be updated automatically, based on the processing the next document, via the process described in FIG. 2B. Alternatively, the next structured representation may be a version of the initial structured representation that is adapted to a jurisdiction different from a jurisdiction corresponding to the initial structured representation.

The following example is for explanatory purposes only and not intended to limit the scope of the invention. FIG. 3A, FIG. 3B, FIG. 4A, and FIG. 4B show an implementation example in accordance with one or more embodiments of the invention. FIG. 3A shows an initial document (300) ((110) in FIG. 1) represented in PDF with an initial document type (302) ((116) in FIG. 1). Initially, the structured representation generator ((104) in FIG. 1) acquires initial document elements (e.g., 304A, 304B, 304C, 304D) ((112A, 112N) in FIG. 1) from the initial document (300) using a PDF mining tool. The PDF mining tool also extracts textual and geometric attributes describing the initial document elements (304A, 304B, 304C, 304D). The geometric attributes include Cartesian coordinates of the initial document elements (304A, 304B, 304C, 304D) within the initial document (300). Next, the structured representation generator derives features for the initial document elements (304A, 304B, 304C, 304D) based on aggregating the attributes of the initial document elements (304A, 304B, 304C, 304D).

The structured representation generator then generates initial structured representation (350), shown in FIG. 3B. The structured representation generator applies machine learning models ((130A, 130N) in FIG. 1) to the features to detect initial form components ((124A, 124N) in FIG. 1) corresponding to the initial document elements (304A, 304B, 304C, 304D). The initial form components include a line description (356N), a line number (358N), a field (360N), and a field number (362N). Next, the structured representation generator clusters the form components into line objects (354A, 354N) of an initial structured representation (350) by applying an unsupervised machine learning model to the geometric attributes of the initial document elements (e.g., 304A, 304B, 304C, 304D). The initial structured representation (350) has a structured representation type (352) ((126) in FIG. 1) that corresponds to the initial document type (302) of the initial document (300) shown in FIG. 3A.

FIG. 3B shows the initial form components that have been clustered into line object N (354N): line description N (356N) corresponding to initial document element A (304A), line number N (358N) corresponding to initial document element D (304D), field A (360A) corresponding to initial document element C (304C), and field number A (362A) corresponding to initial document element B (304B). The unsupervised machine learning model clusters the initial form components into line object N (354N) using a distance measure based on the geometric attributes of the initial document elements (304A, 304B, 304C, 304D) corresponding to the initial form components.

The unsupervised machine learning model then associates field A (360A) with field number A (362A) using a distance measure based on the geometric attributes of the initial document elements (304C, 304B) corresponding to field A (360A) and field number A (362A), respectively. That is, the unsupervised machine learning model determines that the two document elements (304C, 304B) are within a threshold distance of each other within the initial document (300).

The structured representation generator then adds the initial structured representation (350) to a repository ((102) in FIG. 1) that functions as a knowledge base of structured representations. An initial instance of the Federal Tax Schedule 1 form is then populated using the initial structured representation (350). For example, a value for field A (360A), an input field, is received via a graphical user interface (GUI).

Next, as shown in FIG. 4A, the structured representation generator acquires next document elements (e.g., 404A, 404B, 404C, 404D, 404E, 404F, 404G, 404H) from a next document (400) using the PDF mining tool. The next document type (402) matches the initial document type (302) of the initial document (300) shown in FIG. 3A. The next document (400) represents an updated version of the Federal Tax Schedule 1 form that includes a new row of next document elements (404A, 404B, 404C, 404D, 404E, 404F, 404G, 404H). The PDF mining tool extracts textual and geometric attributes describing the next document elements (404A, 404B, 404C, 404D, 404E, 404F, 404G, 404H). Next, the structured representation generator derives features for the next document elements (404A, 404B, 404C, 404D, 404E, 404F, 404G, 404H) based on aggregating the attributes of the next document elements (404A, 404B, 404C, 404D, 404E, 404F, 404G, 404H).

Figure 4B:
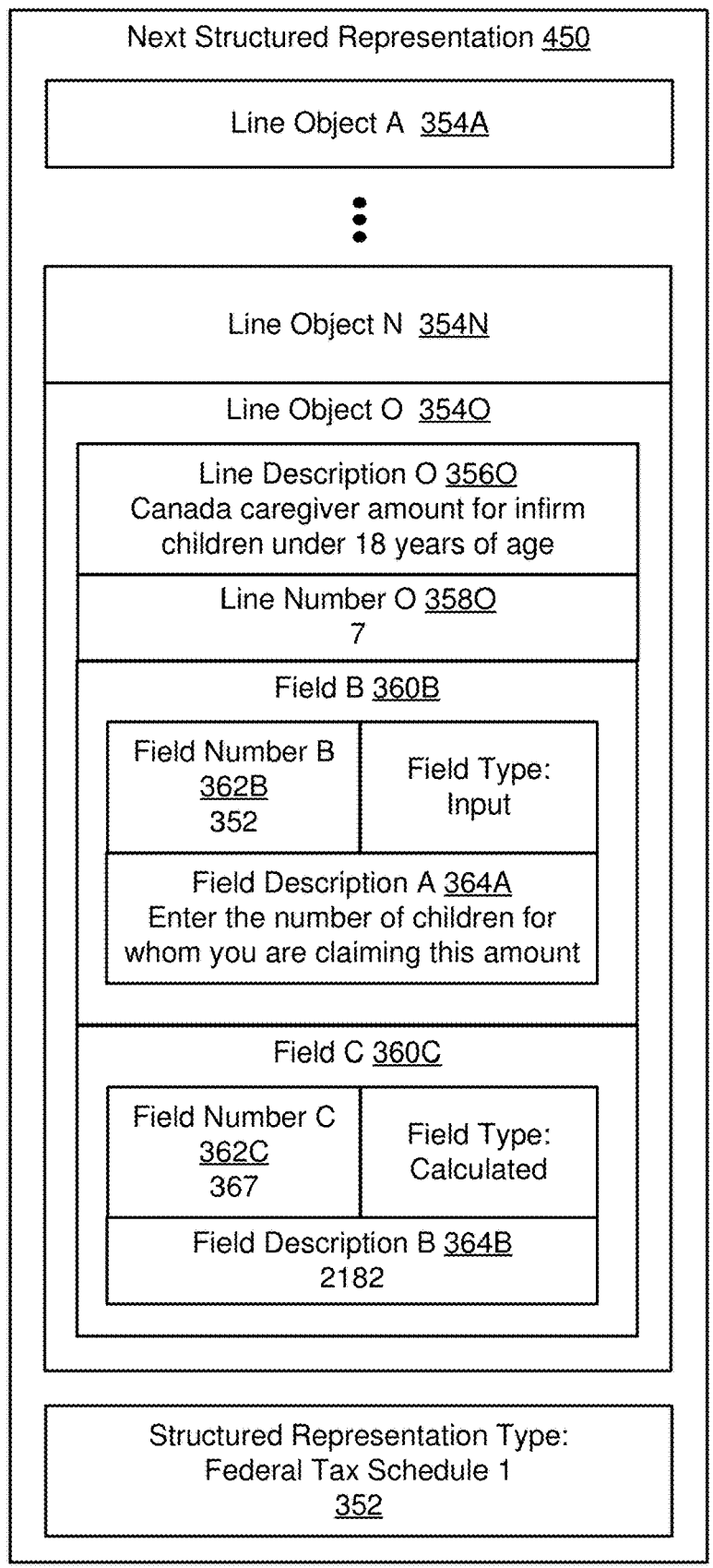

The structured representation generator then applies the machine learning models to the features to detect next form components corresponding to the next document elements (404A, 404B, 404C, 404D, 404E, 404F, 404G, 404H). As shown in FIG. 4B, the next form components include a line description (356O), a line number (358O), two fields (360B, 360C), two field numbers (362B, 362C), and two field descriptions (364A, 364B). The structured representation generator determines that the next form components and the initial form components are different since the next form components include several form components not present in the initial form components.

As illustrated in FIG. 4B, the structured representation generator then clusters the next form components into line objects (354A, 354O) of a next structured representation (450) by applying the unsupervised machine learning model to the geometric attributes of the next document elements (404A, 404B, 404C, 404D, 404E, 404F, 404G, 404H). FIG. 4B shows the next form components that have been clustered into line object O (354O), a line object that is not present in the line objects (354A, 354N) of the initial structured representation (350) illustrated in FIG. 3B. Line object O (354O) includes the following form components: a line description (356O) corresponding to next document element A (404A), a line number (358O) corresponding to next document element H (404H), a field (360B) corresponding to next document element D (404D), a field number (362B) corresponding to next document element C (404C), a field description (364A) corresponding to next document element B (404B), a field (360C) corresponding to next document element G (404G), a field number (362C) corresponding to next document element F (404F), and a field description (364B) corresponding to next document element E (404E). The unsupervised machine learning model clusters the next form components into line object O (354O) using a distance measure based on the geometric attributes of the next document elements (404A, 404B, 404C, 404D, 404E, 404F, 404G, 404H) corresponding to the next form components.

The unsupervised machine learning model then associates field B (360B) with field number B (362B) and field description A (364A) using a distance measure based on the geometric attributes of the next document elements (404D, 404C, 404B) corresponding to field B (360B), field number B (362B), and field description A (364A), respectively. Similarly, the unsupervised machine learning model then associates field C (360C) with field number C (362C) and field description B (364B) using a distance measure based on the geometric attributes of the next document elements (404G, 404F, 404E) corresponding to field C (360C), field number C (362C), and field description B (364B), respectively.

The structured representation generator replaces the initial structured representation (350) of FIG. 3B with the next structured representation (450) of FIG. 4B in the repository. A second instance of the Federal Tax Schedule 1 form is then populated using the next structured representation (450). For example, a value for field B (360B), an input field, is received via a GUI. Then, a value for field C (360C), a calculated field, is calculated using the value received for field B (360B) and the numeric value of field description B (364B), which is $2182, as shown in FIG. 4B.

Figure 5A:
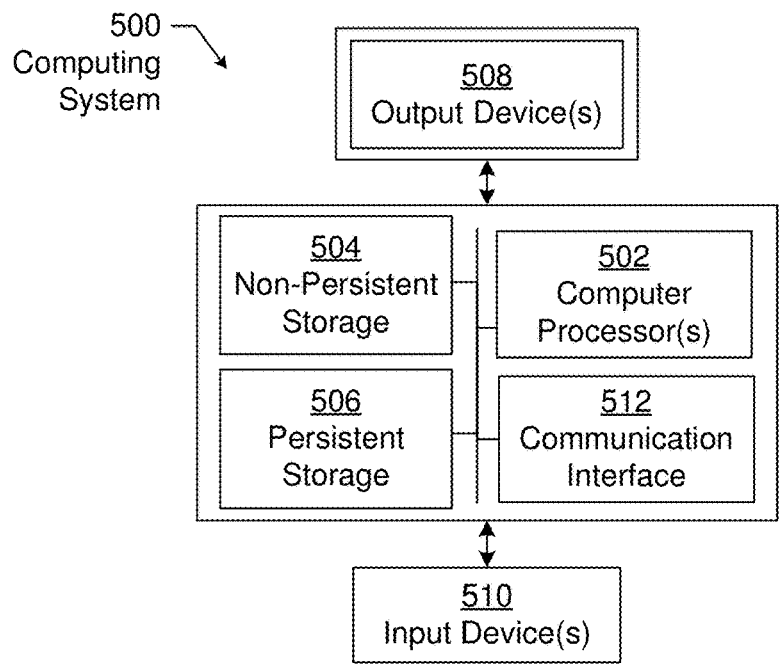
FIG. 5A and FIG. 5B show computing systems in accordance with one or more embodiments of the invention.

Embodiments disclosed herein may be implemented on a computing system. Any combination of mobile, desktop, server, router, switch, embedded device, or other types of hardware may be used. For example, as shown in FIG. 5A, the computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), and numerous other elements and functionalities.

The computer processor(s) (502) may be an integrated circuit for processing instructions. For example, the computer processor(s) may be one or more cores or micro-cores of a processor. The computing system (500) may also include one or more input devices (510), such as a touchscreen, keyboard, mouse, microphone, touchpad, electronic pen, or any other type of input device.

The communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments disclosed herein may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments disclosed herein.

Figure 5B:
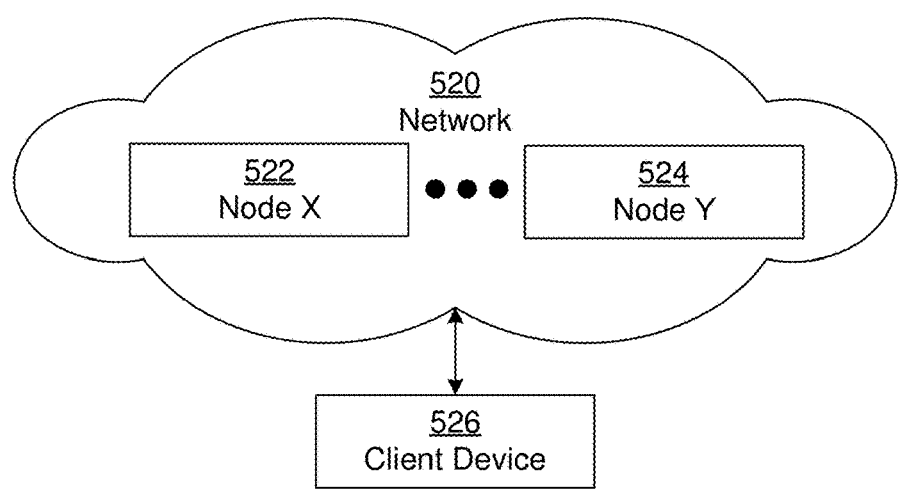

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system shown in FIG. 5A, or a group of nodes combined may correspond to the computing system shown in FIG. 5A. By way of an example, embodiments disclosed herein may be implemented on a node of a distributed system that is connected to other nodes. By way of another example, embodiments disclosed herein may be implemented on a distributed computing system having multiple nodes, where each portion disclosed herein may be located on a different node within the distributed computing system. Further, one or more elements of the aforementioned computing system (500) may be located at a remote location and connected to the other elements over a network.

Although not shown in FIG. 5B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system shown in FIG. 5A. Further, the client device (526) may include and/or perform all or a portion of one or more embodiments disclosed herein.

The computing system or group of computing systems described in FIGS. 5A and 5B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

The computing system in FIG. 5A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The above description of functions presents only a few examples of functions performed by the computing system of FIG. 5A and the nodes and/or client device in FIG. 5B. Other functions may be performed using one or more embodiments disclosed herein.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method, comprising:
    acquiring, from a document, a plurality of document elements and attributes describing the plurality of document elements, wherein one or more of the attributes are geometric attributes describing a placement of the corresponding document element within the document;
    deriving features for the plurality of document elements using the attributes;
    detecting a plurality of form components using the features;
    clustering the plurality of form components into a plurality of line objects of a structured representation by applying an unsupervised machine learning model to the geometric attributes of the plurality of document elements; and
    populating a compliance form using the structured representation.

2. The method of claim 1, wherein applying the unsupervised machine learning model to the geometric attributes of the plurality of document elements comprises:
    determining a first document element of the plurality of document elements that corresponds to a first form component of the plurality of form components;
    determining a second document element of the plurality of document elements that corresponds to a second form component of the plurality of form components;
    determining a distance between the first document element and the second document element using the geometric attributes describing the first document element and the second document element; and
    in response to the distance being within a threshold distance, clustering the first form component and the second form component into a line object of the plurality of line objects.

3. The method of claim 1, further comprising:
    determining that a first document element of the plurality of document elements corresponds to a first form component of the plurality of form components;
    determining that a second document element of the plurality of document elements corresponds to a second form component of the plurality of form components;
    determining a distance between the first document element and the second document element using the geometric attributes describing the first document element and the second document element; and
    in response to the distance being within a threshold distance, associating the first form component with the second form component.

4. The method of claim 1, wherein populating the compliance form comprises:
    obtaining an obtained value for a first form component of the plurality of form components.

5. The method of claim 4,
    wherein the plurality of form components further comprises a second form component comprising a numerical value,
    wherein the first form component is an input field corresponding to a third form component of the plurality of form components, and
    wherein the third form component is a calculated field whose value is calculated using the numerical value, and
    wherein the method further comprises calculating, using the numerical value and the obtained value, a value for the third form component.

6. The method of claim 1, wherein the plurality of line objects comprises a first line object and a second line object, the method further comprising:
    associating the first line object with the second line object based on the geometric attributes of a first subset of the plurality of document elements corresponding to the first line object and the geometric attributes of a second subset of the plurality of document elements corresponding to the second line object.

7. The method of claim 6, wherein the structured representation further comprises a section, and wherein the first line object and the second line object are comprised by the section.

8. The method of claim 1, wherein deriving the features for the plurality of document elements comprises aggregating one or more of the attributes.

9. A system, comprising:
    a memory coupled to a computer processor;
    a repository configured to store:
        a document comprising a plurality of document elements and attributes describing the plurality of document elements, wherein one or more of the attributes are geometric attributes describing a placement of the corresponding document element within the document,
        a structured representation comprising a plurality of form components and a plurality of line objects, and
        an unsupervised machine learning model; and
    a structured representation generator, executing on the computer processor and using the memory, configured to:
        acquire, from the document, the plurality of document elements and the attributes describing the plurality of document elements,
        derive features for the plurality of document elements using the attributes,
        detect the plurality of form components using the features,
        cluster the plurality of form components into the plurality of line objects by applying the unsupervised machine learning model to the geometric attributes of the plurality of document elements, and
        populate a compliance form using the structured representation.

10. The system of claim 9, wherein the structured representation generator is further configured to apply the unsupervised machine learning model to the geometric attributes of the initial plurality of document elements by:

determining a first document element of the plurality of document elements that corresponds to a first form component of the plurality of form components;

determining a second document element of the plurality of document elements that corresponds to a second form component of the plurality of form components;

determining a distance between the first document element and the second document element using the geometric attributes describing the first document element and the second document element; and in response to the distance being within a threshold distance, clustering the first form component and the second form component into a line object of the plurality of line objects.

11. The system of claim 9, wherein the structured representation generator is further configured to:

determine that a first document element of the plurality of document elements corresponds to a first form component of the plurality of form components;

determine that a second document element of the plurality of document elements corresponds to a second form component of the plurality of form components;

determine a distance between the first document element and the second document element using the geometric attributes describing the first document element and the second document element; and in response to the distance being within a threshold distance, associate the first form component with the second form component.

12. The system of claim 9, wherein the structured representation generator is further configured to populate the compliance form by:

obtaining an obtained value for a first form component of the plurality of form components.

13. The system of claim 12, wherein the plurality of form components further comprises a second form component comprising a numerical value, wherein the first form component is an input field corresponding to a third form component of the plurality of form components, wherein the third form component is a calculated field whose value is calculated using the numerical value, and wherein the structured representation generator is further configured to calculate, using the numerical value and the obtained value, a value for the third form component.

14. The system of claim 9, wherein the initial plurality of line objects comprises a first line object and a second line object, and wherein the structured representation generator is further configured to:

associate the first line object with the second line object based on the geometric attributes of a first subset of the plurality of document elements corresponding to the first line object and the geometric attributes of a second subset of the plurality of document elements corresponding to the second line object.

15. The system of claim 14, wherein the structured representation further comprises a section, and wherein the first line object and the second line object are comprised by the section.

* * * * *